United States Patent Office 2,735,789
Patented Feb. 21, 1956

2,735,789

BROMINATED PHOSPHONATE POLYMERS AND METHODS OF FLAMEPROOFING THEREWITH

Arthur Dock Fon Toy, Park Forest, and Kenneth H. Rattenbury, Chicago Heights, Ill., assignors to Victor Chemical Works, a corporation of Illinois No Drawing. Application August 5, 1952, Serial No. 302,836

13 Claims. (Cl. 117—137)

This invention relates to brominated phosphonate polymers, methods of flameproofing therewith and the flameproofed products thereof.

Many methods of flameproofing fabrics and particularly cellulosic textiles have been proposed in the past but none of these has been completely successful. In many of these prior methods the treatment was not permanent in that the material could be easily washed from the fabric while in others the fabric either lost its flame resistance after a short time or the fabric was undesirably changed by the flameproofing material. Thus in many instances, the fabric impregnated with the flameproofing material was so stiff as to be almost useless.

By the methods of this invention it is possible to impart excellent flame resistance to textiles by a single treatment with a single treating solution. The fabric so treated is rendered flameproof even upon successive washings and its other qualities are in no way impaired. The tensile strength is even increased in most instances.

The process of the present invention is accomplished by treating the cloth with a solution of a brominated partial polymer of a dialkenyl monochloromethanephosphonate and thereafter curing the impregnated material at moderate temperatures.

Compounds which are suitable for flameproofing textiles by our new method are brominated partial polymers of di beta,gamma unsaturated alkenyl esters of monochloromethanephosphonic acid such as the allyl, methallyl and crotyl esters. The preferred compounds are brominated diallyl chloromethanephosphonate and brominated dimethallyl chloromethanephosphonate. The esters may be prepared by the reaction of a di beta,gamma unsaturated alkenyl alcohol and chloromethanephosphorus oxychloride in the presence of a tertiary amine. The pure distilled product of such a reaction is the preferred starting material for this invention.

In the process of our invention a 50% solution of a di beta,gamma unsaturated alkenyl ester of chloromethanephosphonic acid is mixed with a small percentage of a polymerization catalyst such as benzoyl peroxide and slowly heated until the viscosity has become approximately three times the original value. This viscosity change, which is in effect a measure of polymerization, obviously depends on the amount of solvent present in the original solution. For a 50% solution a viscosity change of 3 represents the removal of approximately one of the two unsaturations present in a dialkenyl ester. This percentage of partial polymerization has been found to be most satisfactory for this invention although a reasonably wide variation in the degree of polymerization will still permit the obtaining of good results.

The resulting partial polymer solution is then precipitated in a suitable selective solvent such as hexane which serves to separate the soluble monomer from the insoluble partially polymerized material. The precipitated polymer may then be dried and ground to a powder. Careful control of the degree of polymerization and the subsequent precipitation step are of vital importance to this process since the success of the bromination step is dependent on the remaining degree of unsaturation.

For the bromination step it has been found most satisfactory to add bromine in a quantity sufficient to react by addition with approximately one half of the double bonds which were unaffected during the polymerization step. Thus in our preferred method, out of the original two double bonds present in a mol of the dialkenyl phosphonate, approximately one is removed by polymerization and approximately one half of the remainder is removed by bromine addition. It will be obvious that the quantity of bromine added may vary over a wide range. It is surprising to note, however, that at "add-on" levels below approximately 20% the unbrominated material appears to give better results than that which has been brominated. This is thought to be caused by the need for a certain minimum amount of phosphorus being present to provide good flame-proofing characteristics. Once this minimum level, equivalent to approximately 20% polymer "add-on" is reached the bromine seems to act synergistically and greatly increased the flame-proofing qualities. Below this minimum level the bromine only serves to further reduce the amount of phosphorus present for any given per cent "add-on" and thereby lower the flame resistance. We also find that a quantity of bromine suitable for addition to nearly all the remaining double bonds will still provide a suitable flameproofing product but in this case the material tends to lose much of its flame resistance on washing since insufficient unsaturation remains to cause a good bond on the textile during the curing step.

Following the bromination any hydrogen bromide or other acidity formed is neutralized by adding triethylamine or a similar amine until the pH is approximately 7.0. This removes any danger that the fabric might be weakened by acids during the subsequent treatment. Solvent is then removed from the solution by evacuation until the desired concentration is reached for proper "add-on" as explained in the examples to follow. The cloth to be treated is then immersed in this solution for a few minutes to allow good penetration following which the cloth is wrung out and cured by heating at approximately 100° C. for one half hour. This serves to permanently bond more than 85% of the brominated polymer permanently on the cloth. The resulting fabric has excellent flame resistant qualities which remain even after several washings. The strength of the cloth is unimpaired and the "hand" is still satisfactory.

The actual flame resistance of this type of fabric is customarily tested according to the method described as the vertical flame resistance test in the supplement to Federal Specifications for Textiles; General Specifications, Test Methods, CCC–T–191a. In this method a 2½ by 10 inch strip of the treated cloth is suspended vertically and ignited at the bottom with a Bunsen burner. Flame resistance is measured by the burning time of the cloth, total char length of the burn, and amount of afterglow. A flameproofing process is generally held to be satisfactory if the burning time is less than 12 seconds, char length less than 6 inches and afterglow is negligible.

The superiority of the present process and compositions is thus clearly demonstrated by the following examples wherein char lengths after washing are less than 3 inches in some cases. It is to be understood that these examples are included only for purposes of clearness and understanding and that no limitations are to be thereby implied.

Example 1

50 gm. of distilled diallyl chloromethanephosphonate and 50 gm. of Chlorex, a trade name for B,B′ dichloroethylether were placed in a three necked flask equipped with agitator, thermometer, efflux tube and apparatus for providing a nitrogen atmosphere. The solution was then heated to 100° C. under a nitrogen atmosphere and a relative viscosity determined by noting the time of efflux from a 5 ml. pipette, in this case 5.7 seconds. One gram of benzoyl peroxide was added and the heating continued over a period of 46 minutes until the efflux time rose to 21.8 seconds. The solution was cooled to 15° C. and poured into 1500 ml. of hexane which served to dissolve any monomer present and precipitate the partial polymer formed during the previous heating step. The slightly sticky precipitate was worked in a mortar using an additional 1100 ml. of hexane to produce 21.8 gm. of very fine white powder which was air dried. This represents a conversion of 43.6% of the original monomer. 20.8 gm. of this powder was dissolved in 200 ml. of a 30/70 methanol/ethylene dichloride solution and then cooled to 10° C. 8.6 gm. of bromine was then added in 20 minutes. The resulting product was stirred for another 30 minutes and then neutralized to a pH of approximately 7 with 4 ml. of triethylamine resulting in a water-white solution. Solvent was then removed by evacuation until the solution reached a concentration of 26.7%. The cloth to be treated, a 20 by 2½ inch strip of muslin, was immersed in this solution for five minutes, wrung free of excess, and cured for ½ hour at 100° C. It showed a gain in weight equivalent to a 31.4% "add-on." One half of the cloth was tested according to the vertical flame test and showed a burning time of 8 seconds with a narrow char length of 4$^{11}/_{16}$ inches. The second half was washed in a Launderometer for 15 minutes at 140° F. using a 0.5% soap solution and then rinsed and dried. The cloth showed a weight loss of 8.9%. A flame test showed it to have a burning time of 8.5 seconds and a char length of only 2¾ inches.

*Example 2*

A solution of 50 gm. of freshly distilled diallyl chloromethanephosphonate and 50 gm. of Chlorex was placed in a 500 ml. flask equipped as in Example 1. The solution was heated to 100° C. under a nitrogen atmosphere and the efflux time determined to be 4.9 seconds. One gram of benzoyl peroxide was then added and the solution was held at 100° C. for 42 minutes during which time the efflux time rose to 15 seconds. The solution was cooled to 15° C. and precipitated in 1500 ml. of hexane. The precipitate was worked in a mortar using an additional 870 ml. of hexane and resulted in 21.3 gm. of fine white powder after it was air dried. Following the method of Example 1 20.8 gm. of the powder was dissolved in 200 ml. of a 30/70 methanol/ethylene dichloride solution and brominated with 8.6 gm. of bromine in 9 minutes at 10° C. The resulting solution was stirred for another hour and then neutralized with 4.5 ml. of triethylamine. It was concentrated by evacuation until a strength of 26.6% was reached and this solution was then used to prepare solutions ranging down to a concentration of only 8.5%. Strips of cloth were immersed in this series of solutions, wrung out, and cured according to the methods of Example 1. When subjected to the vertical flame test the following data resulted.

| Sample | A | B | C | D | E |
|---|---|---|---|---|---|
| Percent "add-on" | 32.6 | 26.0 | 21.2 | 16.9 | 14.0 |
| Burning time, unwashed-sec. | 7.7 | 8.5 | 8 | 10 | 12 |
| Char length, unwashed-ins. | 4¾ | 4¾ | 6⅛ | 8⅛ | 8⅛ |
| Weight loss on washing, percent | 9.22 | 7.35 | 7.1 | 5.65 | 4.63 |
| Burning time, washed-sec. | 11.7 | 9 | 12 | 12 | |
| Char length, washed-ins. | 2⅞ | 6 | 7 | | |

These data show that good flame resistance is provided over a wide range of percentage "add-on" and that resistance is excellent even after washing where the "add-on" is from 20 to 30%. Exceedingly good flame resistance is afforded in the 30% range. The loss on washing shown in the above data occurs only on the first washing and subsequent washings produce no detrimental effect on the qualities of the cloth.

*Example 3*

A solution of 50 gm. of distilled dimethallyl chloromethanephosphonate and 50 gm. of Chlorex was placed in a 500 ml. flask with auxiliaries as were used in Example 1. The solution was heated to 100° C. under a nitrogen atmosphere and the efflux time found to be 5.3 seconds. One gram of benzoyl peroxide was added and the efflux rose to 6.1 seconds in 50 minutes, an additional half gram brought the efflux time to 11.5 seconds in 2⅓ hours so a final 0.25 gram of benzoyl peroxide was added after which the efflux time slowly rose to 16 seconds at the end of 3⅓ hours total time. The solution was cooled to room temperature. Following the procedure in Example 1 the solution was precipitated in 1500 ml. of hexane and further worked with 900 ml. of hexane to give 28.6 gm. of free-flowing white powder. This represents a 57.2% conversion from the original monomer. 20 gm. of this powder was dissolved in 160 ml. of 30/70 methanol/ethylene dichloride solution and brominated with 11.9 gm. of bromine at 10° C. in one hour. It was stirred for an additional ½ hour and then neutralized with triethylamine to form a water-white solution. This solution was then concentrated by evacuation to a concentration of 29%. A 20 by 2½ inch strip of muslin was impregnated by immersing it in the solution for five minutes after which the excess solution was wrung out and the cloth was cured at 100° C. for ½ hour. The cloth was found to have an "add-on" of 34% and one-half when tested with the vertical flame test had a burning time of 11 seconds and a char length of 8¼ inches. The second half after washing had a burning time of 11 seconds and a char length of 8⅛ inches.

Modifications of the procedure shown above will be obvious to those skilled in the art. Thus Chlorex is the preferred solvent for the polymerizing step since it appears to promote a more homogeneous polymer, but ethylene dichloride, benzene or other similar solvents may be used. We have found that efflux time for a 50% solution from 2 to 4 times the initial value give the best results although there is a danger of gelling as 4 is approached, and below 2 there may not be sufficient polymerization to produce satisfactory permanence on the cloth. The final efflux time is a function of amount of catalyst, temperature, and time of heating. The higher the temperature, and percentage of catalyst the shorter the heating time. The quantities disclosed herein are from about 2 to about 3½ % of the polymer weight. Temperatures from 70 to 110° C. are satisfactory although a temperature of about 100° C. is preferred. Heating time is thus dependent on the desired efflux time. Air, oxygen, hydrogen peroxide, and the like are also suitable as catalysts. The inert atmosphere is used only to produce consistent results with catalysts other than air or oxygen. Hexane is the preferred precipitating agent, but petroleum ether or benzene are suitable, or any other solvent which shows a solubility differential for monomer and polymer.

For the bromination the methanol/ethylene dichloride solution has proved most satisfactory. The methanol in particular seems to help the process. Chloroform may replace the ethylene dichloride. Approximately at least a 10% solution is necessary for the bromination step to keep the solution thin enough for satisfactory operation. The amount of bromine added is preferably about one half mole of bromine per mole of monomer present. Following bromination and neutralization excess solvent is then removed to obtain the desired solution strength. Solution strengths may range from 10 to 40% depending on the desired "add-on." The "add-on" may be at least 10% but is preferably between about 20 to 35%. Higher amounts are not harmful but are economically impractical. A curing temperature of about 80 to 110° C. is preferred. At least 85% and preferably greater than 90% of the brominated polymer should be permanently bonded on the cloth during the curing step.

It should be noted that the phosphonate esters should be partially polymerized before the brominating step. If the monomer is brominated first, the resulting polymer is less satisfactory either in flameproofing characteristics, in its ability to become permanently attached to the fabric or both.

As stated previously, the preferred extent of bromination of the polymer is equivalent to about 25% of the original unsaturation in the monomer. In other words, when about one half the unsaturation of the monomer is used in making the preferred partial polymer about one half the remaining unsaturation is brominated and the other one half is available for curing on the cloth. In Examples 1 and 2 above the amount of bromine used calculates to about 27.2% of the original monomer unsaturation. Example 3 calculates to about 44.4%. Thus, where 50% of the original unsaturation were used in forming the polymer, about 54% in Examples 1 and 2 and about 90% in Example 3 of the remainder were brominated. The maximum amount of bromination of the unsaturation of the polymer is preferably about 90% although the polymer can be completely brominated and still have excellent flameproofing qualities. In the latter case, however, the bonding on the cloth will not be as good, resulting in a higher loss on washing. There is no lower limit to the bromination as even the unbrominated polymer is highly flame resistant on fabric.

The term "add-on" used herein means the weight of material remaining on the cloth or other fabric expressed as percentage by weight of the untreated cloth.

The term "flameproof" used herein means that the treated material is at least flame resistant and preferably is self-extinguishing in that it will cease to burn as soon as the flame has been removed.

The foregoing detailed description has been given for clearness of understanding only and no unnecessary limitations should be understood therefrom as modifications will be obvious to those skilled in the art.

We claim:

1. A brominated polymer of di(beta gamma unsaturated)alkenyl monochloromethanephosphonate.
2. The polymer of claim 1 wherein each alkenyl group is allyl.
3. The polymer of claim 1 wherein each alkenyl group is methallyl.
4. The polymer of claim 1 wherein approximately one-half of the double bonds of the phosphonate are polymerized.
5. The polymer of claim 1 wherein the brominated polymer contains up to one mole of bromine per mole of phosphonate.
6. The polymer of claim 1 wherein approximately one-half of the double bonds of the phosphonate are polymerized, and approximately one-half of the remaining double bonds are brominated.
7. The method of flameproofing a cellulosic fabric which comprises applying a solution of a brominated partial polymer of a di-(beta gamma unsaturated)alkenyl monochloromethanephosphonate to the fabric, removing the excess solution and heating at a temperature and for a time sufficient to fix the polymer on the fabric in an amount of at least 10% by weight of the untreated fabric.
8. The method of claim 7 wherein each alkenyl group is allyl.
9. The method of claim 7 wherein each alkenyl group is methallyl.
10. The method of claim 7 wherein the amount of polymer on the fabric is between about 20% and about 30% by weight.
11. The method of preparing a composition suitable for flameproofing a cellulosic fabric which comprises dissolving a di-(beta gamma unsaturated)alkenyl monochloromethanephosphonate in a solvent, partially polymerizing said phosphate, separating the partial polymer, dissolving said polymer in a solvent, and brominating the polymer.
12. A flameproof material comprising a cellulosic fabric impregnated with at least 10% by weight of a brominated polymer of a di-(beta gamma unsaturated) alkenyl monochloromethanephosphonate.
13. The material of claim 12 wherein the amount of polymer on the fabric is between about 20% and about 30% by weight.

References Cited in the file of this patent

UNITED STATES PATENTS

| Number | Name | Date |
|---|---|---|
| 2,425,765 | Fon Toy et al. | Aug. 19, 1947 |
| 2,497,637 | Fon Toy | Feb. 14, 1950 |
| 2,553,871 | Oliver | May 22, 1951 |
| 2,574,515 | Walter et al. | Nov. 13, 1951 |
| 2,574,518 | Walter et al. | Nov. 13, 1951 |
| 2,586,885 | Fon Toy et al. | Feb. 26, 1952 |
| 2,601,520 | Harman et al. | June 24, 1952 |
| 2,660,542 | Walter et al. | Nov. 24, 1953 |
| 2,660,543 | Walter et al. | Feb. 26, 1953 |